(12) United States Patent
Affre de Saint Rome

(10) Patent No.: US 8,783,608 B2
(45) Date of Patent: *Jul. 22, 2014

(54) AIRCRAFT ANCHORING HARPOON WITH JACK CONNECTED TO PRESSURIZED GAS SOURCE

(75) Inventor: Ronan Affre de Saint Rome, Carantec (FR)

(73) Assignee: DCNS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/262,248

(22) PCT Filed: Apr. 1, 2010

(86) PCT No.: PCT/FR2010/050625
§ 371 (c)(1),
(2), (4) Date: Dec. 14, 2011

(87) PCT Pub. No.: WO2010/112780
PCT Pub. Date: Oct. 7, 2010

(65) Prior Publication Data
US 2012/0091272 A1    Apr. 19, 2012

(30) Foreign Application Priority Data
Apr. 3, 2009  (FR) ...................... 09 52175

(51) Int. Cl.
*B64F 1/12*    (2006.01)

(52) U.S. Cl.
USPC .................. 244/115; 244/114 R; 244/1 R

(58) Field of Classification Search
USPC .............. 244/114 R, 115, 1 R; 411/374, 378; 52/153, 161, 160, 156; 248/156, 160, 248/161, 188.8; 294/192, 195
See application file for complete search history.

(56) References Cited

U.S. PATENT DOCUMENTS

| 1,796,147 | A | * | 3/1931 | Green et al. ..................... 52/161 |
| 3,054,123 | A | * | 9/1962 | Moeller ........................... 441/25 |
| 3,154,042 | A | * | 10/1964 | Thomason et al. ........... 114/295 |
| 3,303,807 | A |   | 2/1967 | Stewart et al. |
| 3,430,305 | A | * | 3/1969 | Geffner .......................... 24/603 |

(Continued)

FOREIGN PATENT DOCUMENTS

| EP | 547275 A1 | * | 6/1993 | ............... B64F 1/12 |
| FR | 2 701 689 A1 | | 8/1994 | |

(Continued)

OTHER PUBLICATIONS

International Search Report, dated Aug. 26, 2010, from corresponding PCT application.

*Primary Examiner* — Isam Alsomiri
*Assistant Examiner* — Assres H Woldemaryam
(74) *Attorney, Agent, or Firm* — Young & Thompson

(57) ABSTRACT

An anchoring harpoon (1) intended in particular for an aircraft, capable of cooperating with an anchoring grate (2) of a platform, includes a jack member (3) including a cylinder element (4) containing a mobile piston element (5) provided with a rod (6) that extends beyond the cylinder element, the free end of which includes a harpoon head (7) that is hooked in the grate and includes retaining fingers (8, 13, 14) that can be moved between a retracted position and an active position by control elements (9). The jack member is connected to a pressurized fluid source (30) by the control elements (31) and the pressurized fluid source includes a consumable gas cartridge (30).

19 Claims, 5 Drawing Sheets

(56) References Cited

U.S. PATENT DOCUMENTS

Figure 1:
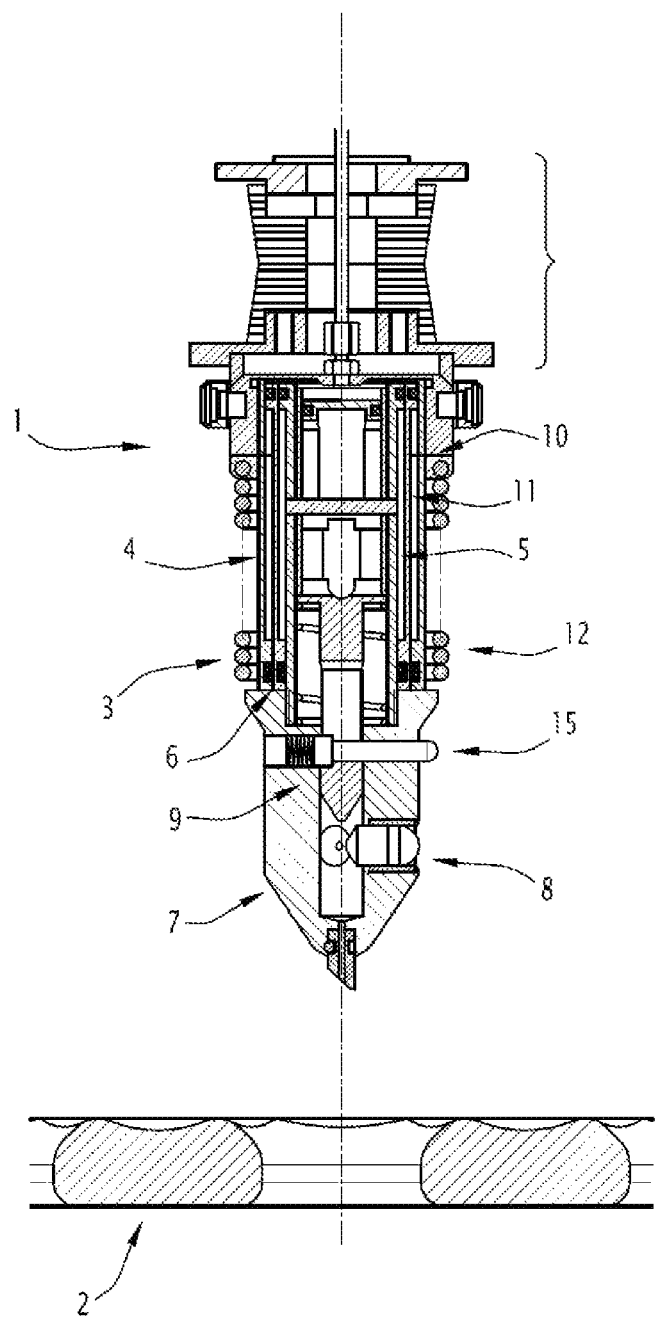

| | | | | |
|---|---|---|---|---|
| 3,502,286 A * | 3/1970 | Warren | | 244/17.17 |
| 3,552,688 A | 1/1971 | Baekken | | |
| 3,577,949 A * | 5/1971 | Mueller et al. | | 114/295 |
| 3,653,139 A * | 4/1972 | Temple et al. | | 42/106 |
| 4,275,680 A * | 6/1981 | Pennington et al. | | 114/295 |
| 4,381,092 A * | 4/1983 | Barker | | 244/172.4 |
| 5,080,304 A * | 1/1992 | Stump et al. | | 244/115 |
| 5,209,431 A * | 5/1993 | Bernard et al. | | 244/17.17 |
| 5,480,108 A * | 1/1996 | Amiand et al. | | 244/115 |
| 5,971,072 A * | 10/1999 | Huber et al. | | 166/297 |
| 6,176,519 B1 * | 1/2001 | Limingoja | | 280/762 |
| 7,104,505 B2 * | 9/2006 | Tchoryk et al. | | 244/172.4 |
| 7,275,889 B1 * | 10/2007 | McGill | | 404/6 |
| 7,409,794 B2 * | 8/2008 | Triano et al. | | 43/19 |
| 8,286,620 B2 * | 10/2012 | Williford | | 124/74 |
| 2005/0188979 A1 * | 9/2005 | Berry | | 124/76 |
| 2008/0003077 A1 * | 1/2008 | Anderson | | 411/347 |
| 2011/0233332 A1 * | 9/2011 | Proutiere | | 244/115 |

FOREIGN PATENT DOCUMENTS

| | | | |
|---|---|---|---|
| GB | 930 794 A | 7/1963 | |
| GB | 2 075 931 A | 11/1981 | |
| WO | WO 9013480 A1 * | 11/1990 | B64F 1/12 |
| WO | 91/04910 A1 | 4/1991 | |

* cited by examiner

AIRCRAFT ANCHORING HARPOON WITH JACK CONNECTED TO PRESSURIZED GAS SOURCE

The present invention relates to an anchoring harpoon notably of an aircraft capable of cooperating with an anchoring grate of a platform and to an anchoring system including such a harpoon.

Such harpoons and such anchoring systems are already generally known in the state of the art.

Thus for example, document FR-A-2 701 689 describes a harpoon intended to equip an aircraft with a rotary wing such as for example a helicopter and which may be shot towards a landing platform of a ship so that the head of the harpoon attaches onto the grate and thereby forms an anchoring point for the aircraft, notably facilitating the landing operation of the latter.

The anchoring harpoon described in this document includes cylinder means in which move piston means provided with a rod extending beyond the cylinder means and the free end of which includes a harpoon head for attachment in the grate. This harpoon head is actually provided with retaining fingers in the grate, which may be moved radially between a retracted position and an active position by control means.

Such harpoons have already been successfully applied on many ships for ensuring the anchoring of aircraft, for example of the helicopter type.

For some time, numerous attempts have also been made for loading aircraft of the rotary wing drone type on notably military platforms.

The applicant moreover developed and successfully tested an automatic landing and take-off system for a drone with a rotary wing on and from such a ship.

The application of these drones also requires the use of harpoons and anchoring grates.

Studies have shown that successful adaptation of anchoring harpoons already known for helicopters, directly on drones with a rotary wing was not conceivable.

Actually, these studies have pointed out problems regarding size, power supply, maintenance, etc.

The object of the invention is therefore to solve these problems.

For this purpose, the object of the invention is an anchoring harpoon notably of an aircraft, capable of cooperating with an anchoring grate of a platform, including jack means comprising cylinder means in which move piston means provided with a rod extending beyond the cylinder means and the free end of which includes a harpoon head for attachment in the grate, provided with retaining fingers for retention therein, which are movable between a retracted position and an active position by control means, characterized in that the jack means are connected to a source of pressurized fluid through control means and in that this pressurized fluid source includes a consumable gas cartridge.

According to other features of the invention, taken separately or combined:
the gas is $CO_2$,
the control means comprise solenoid valve means controlled through its opening and closing for feeding the jack means,
the cylinder means of the jack include at least two cylinder portions telescoping one in the other and movable between a retracted position in one another and an active position in which one is protruding relative to the other,
the means for controlling the movements of the fingers comprise a control piston which is slidably movable in the rod of the jack and associated with a bistable actuator of the fingers, which is movable between a retracted and active positions in which the fingers are deployed by successive applications of pressure pulses in the jack means,
the bistable actuator is a rotary mechanical lock,
the bistable actuator includes a wheel with beveled teeth interposed between the control piston and a rod for actuating the fingers, positioned in a sleeve connected to the jack rod, the end of the piston facing the wheel with beveled teeth itself including teeth so as to rotate the wheel with beveled teeth in the sleeve upon applying pressure pulses in the jack means and therefore movements of the control piston, the teeth of the wheel being also adapted so as to cooperate with successive notches of different heights of the sleeve, in order to define stable active and retracted positions of the rod for actuating the fingers,
it includes a spring for urging the rod for actuating the fingers in the retracted position,
the corresponding end of the jack means is associated with the aircraft and in that a helical return and flattening spring is interposed between this end of the jack and the harpoon head,
the helical spring is arranged around the jack means,
it includes triggering means for preventing movement of the fingers towards their active position as long as the harpoon head is not abutting in the anchoring grate.

The object of the invention is also an anchoring system notably for an aircraft of the drone type with a rotary wing which comprises an anchoring harpoon as described earlier.

Figure 2:
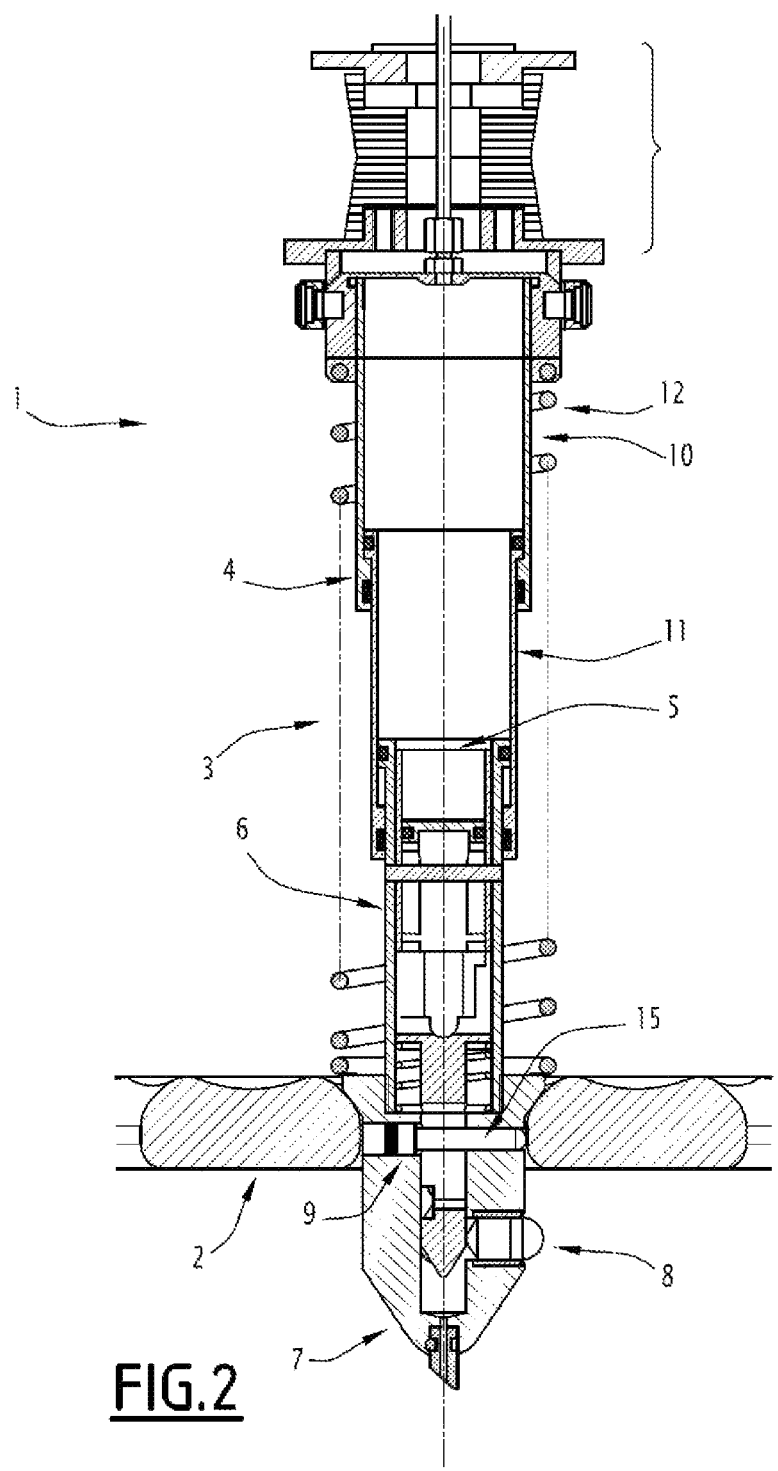
Figure 3:
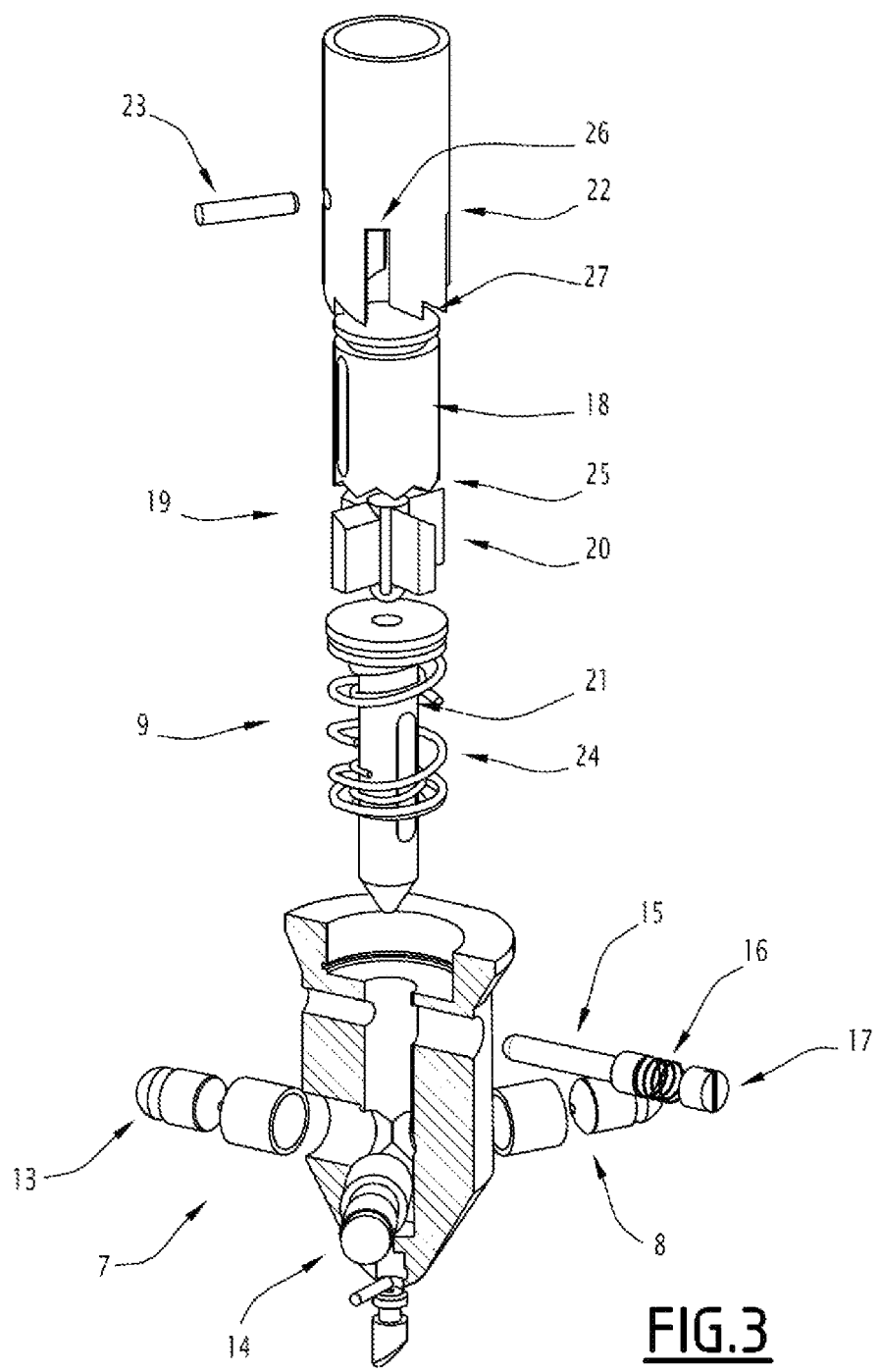
Figure 4:
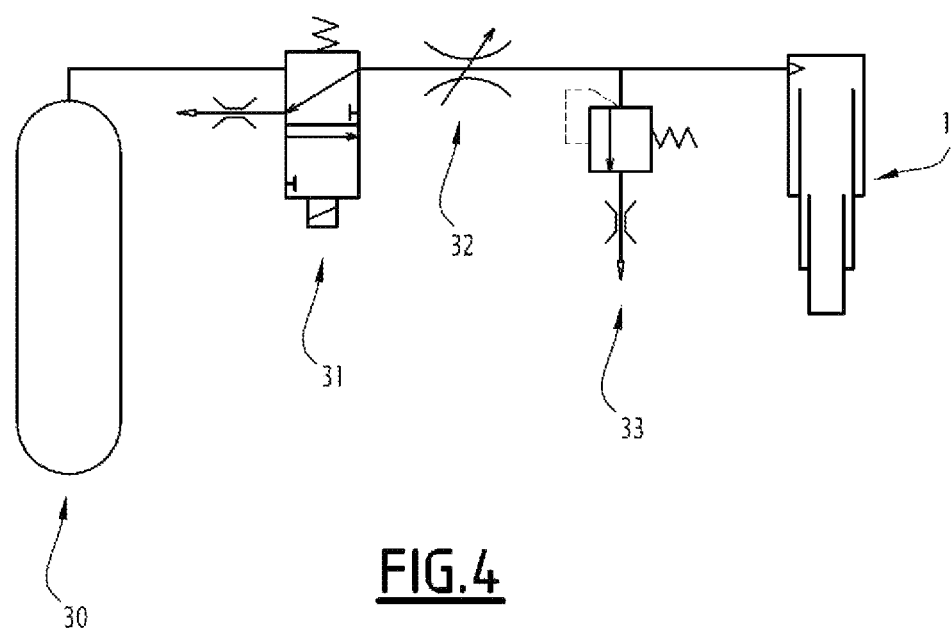
Figure 5:
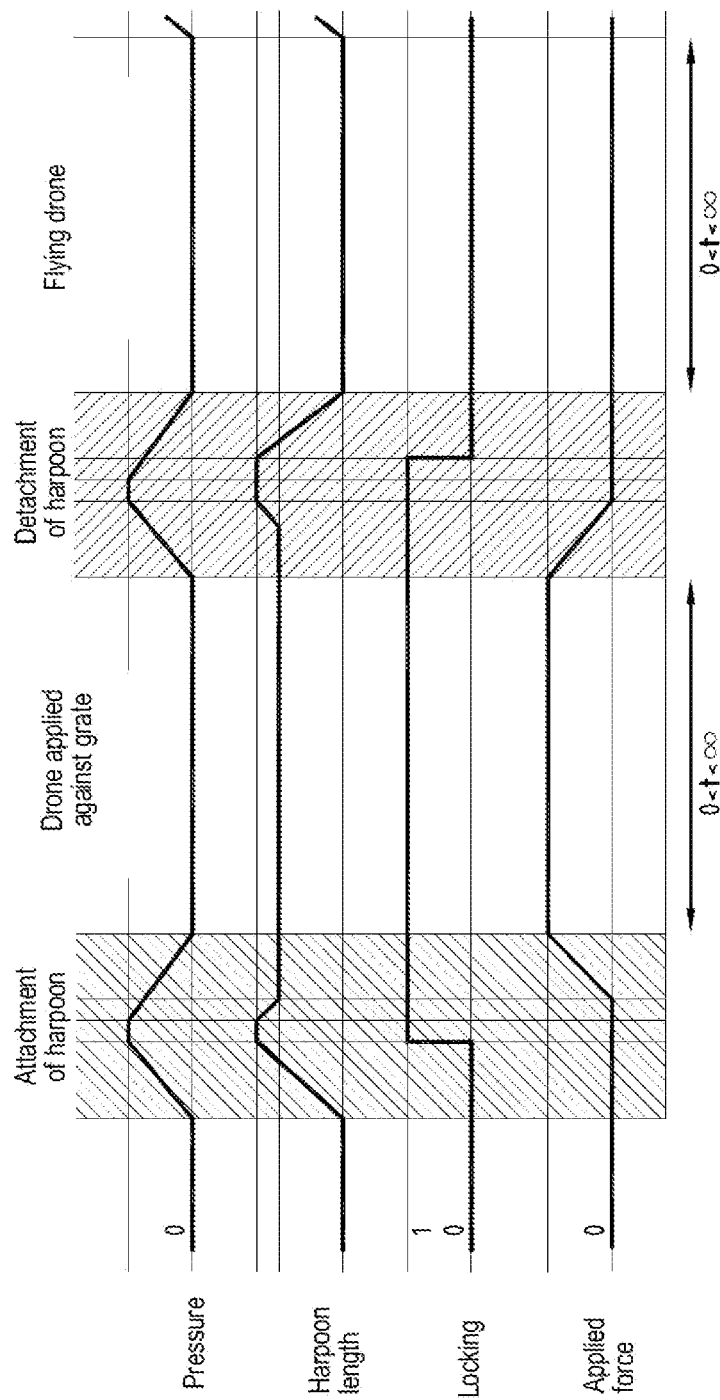

The invention will be better understood with the description which follows, only given as an example, and made with reference to the appended drawings, wherein:

FIGS. 1 and 2 represent sectional views of an anchoring harpoon according to the invention in the retracted and active anchoring positions in an anchoring grate of a platform, respectively, FIG. 3 illustrates an exploded perspective view of an attachment harpoon head entering the structure of a harpoon according to the invention, FIG. 4 illustrates a block diagram illustrating the pressurized fluid supply for a harpoon according to the invention, and FIG. 5 illustrates the operation of such a harpoon.

Indeed, an anchoring harpoon notably of an aircraft on a platform of the military ship type or other type is illustrated in these figures and in particular in FIGS. 1 and 2.

The aircraft may for example be a drone with a rotary wing.

This harpoon is designated by the general reference 1 in these figures and is adapted for cooperating with an anchoring grate of the platform, this grate being designated by the general reference 2 in these figures.

In fact, the harpoon includes jack means designated by the general reference 3, comprising cylinder means designated by the general reference 4, in which move piston means designated by the general reference 5.

These piston means are provided with a rod 6 extending beyond the cylinder means and the free end of which includes a harpoon head for attachment in the grate, this harpoon head being designated by the general reference 7.

In fact and as this is described in the prior document mentioned earlier, this harpoon head is provided with retaining fingers in the grate, which are movable radially between a retracted position and an active position by control means, as this will be described in more detail subsequently.

In these figures, one of the fingers is designated by the general reference 8 and the means for controlling the latter by the general reference 9.

The structure of these control means will also be described in detail with reference to FIG. 3.

Referring back to FIGS. 1 and 2, it is seen that the fingers and the control means are illustrated in the retracted position in FIG. 1 and in the active position in FIG. 2, when the harpoon is deployed, the control means being moved in the rod in order to cause radial movement of the retaining fingers between the retracted position in FIG. 1, in the head of the harpoon and the active retaining position in FIG. 2, protruding radially relative to this head for blocking it in the grate.

In order to solve the different problems for integration to a drone notably as described earlier, in the anchoring harpoon according to the invention, the cylinder means of the jack include at least two cylinder portions telescoping in one another and movable between a retracted position in each other and an active anchoring position protruding relatively to each other, as illustrated in these FIGS. 1 and 2, respectively.

In these figures, both cylinder portions telescoping in to one another are designated by references 10 and 11, respectively.

The upper cylinder portion 10 is then associated with means for attachment on the drone, these means having any suitable conventional structure while the other end of this upper cylinder portion 10 is adapted so as to receive the lower cylinder portion 11 which itself bears the rod 6, the free end of which bears the harpoon head 7.

The jack means are then connected to a source of pressurized fluid through control means in order to control their operation i.e. deployment of the anchoring harpoon and its attachment or its detachment relatively to the anchoring grate.

For this purpose, a helical return and flattening spring 12 is interposed between the end of the upper cylinder portion associated with the aircraft and the harpoon head in order to ensure, as this is illustrated in FIG. 2 when the harpoon head is anchored in the grate, proper application of the drone against the platform.

The harpoon head 7 may be similar to the one already described in the document mentioned earlier and include for example three retaining fingers arranged at 120° relatively to each other and for example designated by the general references 8, 13 and 14 in FIG. 3. These fingers are then movable between a retracted position and an active position protruding radially relatively to the remainder of the head in order to anchor a harpoon in the grate under the control of the control means designated by the general reference 9 in FIGS. 1, 2 and 3.

Also conventionally, the harpoon head 7 may include a trigger for arming these control means 9 in order to prevent movement of the fingers towards their active position as long as the harpoon head is not abutting in the anchoring grate, i.e. in a proper anchoring position in the grate.

This trigger was also described previously and is designated by the general reference 15 in this FIG. 3.

This trigger 15 is then arranged transversely in the harpoon head 7, protruding radially from the head and is associated with a spring 16 and with an abutment member 17 so as to be pushed back into the harpoon head when the latter is in the proper position in the anchoring grate as this is illustrated in FIG. 2, and allowing movement of the control means 9 and of the retaining fingers.

The control means 9 as for them comprise a piston designated by the general reference 18, slidably movable in the rod of the jack and associated with a bistable actuator for the fingers, movable between a retracted position and an active position for deployment of the fingers by successive applications of pressure pulses in the jack means.

This bistable actuator for the fingers is designated by the general reference 19 and includes several parts forming what is commonly called a rotary lock.

This bistable actuator actually includes a wheel with beveled teeth designated by the general reference 20 in FIG. 3, interposed between the control piston 18 and a rod for actuating the fingers designated by the general reference 21 in FIG. 3.

The piston 18 and the wheel with beveled teeth 20 are arranged in a sleeve designated by the general reference 22 connected to the rod 6 of the jack for example via a pin designated by the general reference 23.

A spring for urging the rod 21 for actuating the fingers in the retracted position is also provided, this spring being designated by the general reference 24 in this FIG. 3.

The end of the piston 18 facing the wheel with beveled teeth itself includes teeth such as the tooth designated by the general reference 25 in this figure, so as to rotate the wheel with beveled teeth 20 in the sleeve 22 upon applying pressure pulses in the jack means and therefore corresponding movements of the piston 18. The beveled teeth of the wheel 20 are then also adapted so as to cooperate with successive notches of different heights of the sleeve 22 in order to define stable active and retracted positions of the rod 21 for actuating the fingers and therefore of these fingers.

Two successive notches of different heights of the sleeve are for example designated by general references 26 and 27 in this figure.

In the retracted position of the control means 9, the teeth of the wheel 20 are for example pressed against the notches such as the notch 26. Upon applying pressure in the jack means, the piston 18 causes movement of the toothed wheel 20 and of the actuation rod 21 against the elastic force of the spring 24 if the trigger 15 is armed, i.e. pushed back, the head being in the right position in the grate.

During this thrust, the teeth 25 of the piston 18 also tend to rotate the toothed wheel. However this movement of rotation of the wheel is prevented by the cooperation of the teeth of the wheel with the edges of the sleeve 22 on each side of the notch 26 until the moment when the beveled teeth of the wheel 20 are able to cross the corresponding end of the sleeve 22 so as to cooperate with the notch 27 for maintaining the teeth and therefore of the actuation rod 21 in the active position for deployment of the fingers of the attachment head.

The blocking in position is then ensured by the force of the spring 24 which urges the actuation rod 21 and the toothed wheel 20 to remain in position against the notch 27.

The fluid pressure may then be released in the jack means while retaining anchoring of the aircraft in the grate.

A new application of a fluid pressure pulse in the jack means causes a new angular movement of the wheel with beveled teeth facing the next notch corresponding to the retracted position of the rod of the actuation means under the action of the spring 24 in order to unblock the head.

Of course it is obvious that other embodiments of this bistable actuator controlled by successive applications of pressure pulses in the jack means, are conceivable.

It is then conceivable that the use of such a bistable mechanical lock allows the sole use of pressure pulses in the jack means and no longer forces pressure to be maintained in the latter as this was the case of the jack means of the state of the art.

A single pressure pulse actually allows the deployment of the fingers and a single other pressure pulse allows them to be retracted.

Further, it also gives the possibility of modifying the means for feeding pressurized fluid to the jack means.

A block diagram of these supply means is given in FIG. 4.

In fact, the supply means may include a source of pressurized fluid which for example appears as a consumable gas cartridge such as for example a consumable $CO_2$ cartridge, designated by the general reference 30 in this figure.

This gas cartridge 30 is then connected at the inlet of normally closed solenoid valve means 3/2, designated by the general reference 31, itself connected to adjustable throttling means allowing limitation of the gas flow rate during the harpooning and the purging, designated by the general reference 32.

A safety valve adjusted to a pressure slightly above the desired harpooning pressure is also provided, this valve being designated by the general reference 33, the harpoon as for it still being designated by the general reference 1.

The control upon opening and closing the solenoid valve means then allows control of the feeding of the jack means in the form of pressure pulses.

This pulsed operation is illustrated in FIG. 5 which shows that harpoon attachment and detachment are accomplished by successive applications of pressure pulses in the jack means, which allows deployment of the telescopic harpoon which remains in the deployed position as long as the anchoring head is locked in the grate and with this it is also possible to obtain a force for flattening the aircraft against the platform.

It is also conceivable that by applying a pressure pulse by controlling the opening of the solenoid valve means 31 described earlier, it is possible to deploy the cylinder portions of the jack means so as to have the attachment head of the harpoon penetrate the grate.

The harpoon head will then be accommodated in a cell of the grate by which the arming trigger 15 may be pushed back and therefore the piston 18, under the action of the pressure of the fluid in the jack means, may push the rod 21 for actuating the fingers 8 towards the deployed position of these fingers in order to lock the head in the grate.

The rotary bistable mechanical lock allows blocking of the rod and of the fingers in this active anchoring position of the head in the grate and the fluid pressure may then be released in the jack means, the helical return and flattening spring 12 allowing the drone to be maintained in position, applied against the grate.

Upon applying a new pressure pulse in the jack means, the piston 18 rotates the wheel with beveled teeth 20 in order to unlock the rotary mechanical lock by which, during release of the fluid pressure in the jack means, the spring 24 may push back the rod 21 for actuating the fingers towards a retracted position and the latter may return to a retracted position in the anchoring head, which releases this anchoring head from the grate and allows via the helical spring 12 the jack means to be brought back towards a retracted position (FIG. 1).

It is then conceivable that such a structure has a certain number of advantages as compared with the harpoons of the state of the art.

The use of a telescopic jack actually gives the possibility of doubling the deployment travel of the harpoon for a same folded-back length and therefore considerably reducing the length of the harpoon in the folded-back position which allows adaptation to the bulkiness constraints related to onboard loading of a drone.

The use of a flattening and return spring placed outside the jack means also gives the possibility of obtaining a proper flattening force against the grate.

The use of a bistable actuator with a rotary mechanical lock allows the harpoon to be maintained in its position between two pulsed commands for a change of state i.e., either folded-back or blocked in the grate.

The transition from one state to the other is accomplished by applying a pulse of pressurized fluid in the jack means. This then allows the use of a consumable gas cartridge for example associated with means for controlling a solenoid valve for ensuring the supply.

Of course, different embodiments of the parts described may be considered and other applications may also be considered, e.g. for anchoring aircraft on oil industry platforms or other platforms.

The invention claimed is:

1. An aircraft anchoring harpoon adapted for cooperating with an anchoring grate (2) of a platform, comprising:
    jack means (3) comprising cylinder means (4), the cylinder means (4) containing a mobile piston (5) that is moveable with respect to the cylinder means (4), the mobile piston (5) comprising a jack rod (6) fixedly attached to the mobile piston (5) to move in accordance with a movement of the mobile piston (5), a free end of the rod (6) extending beyond the cylinder mean, the free end of the jack rod including a harpoon head (7) for anchoring the harpoon in the grate (2), the jack means being configured to deploy the harpoon head,
    the harpoon head (7) provided with retaining fingers (8, 13, 14), the retaining fingers being movable between a retracted position and an active position by first control means (9) for deploying the retaining fingers;
    second control means (31) for deploying the harpoon head via the jack means; and
    a pressurized fluid source (30) comprising a consumable gas cartridge (30),
    the jack means connected to the pressurized fluid source (30) through the second control means (31).

2. The anchoring harpoon according to claim 1, wherein the gas is $CO_2$.

3. The anchoring harpoon according to claim 1, wherein the second control means comprise a solenoid valve means (31) operatively connected to the jack means, opening and closing the solenoid valve means (31) feeding the jack means.

4. The anchoring harpoon according to claim 1, wherein the cylinder means (4) of the jack include at least two cylinder portions (10, 11) telescopically sliding in one another and which are movable between a position retracted in one another and an active position in which one is salient relative to the other.

5. The anchoring harpoon according to claim 1, wherein the first control means (9) comprise a control piston (18) which is slidably movable in the jack rod and associated with a bistable actuator (19) of the fingers, which is movable between a retracted position and an active position of extension of the fingers by successive applications of pressure pulses in the jack means.

6. The anchoring harpoon according to claim 5, wherein the bistable actuator is a rotary mechanical lock (19).

7. The anchoring harpoon according to claim 6, wherein,
    the bistable actuator (19) includes a wheel (20) with bevelled teeth interposed between the control piston (18) and an actuating rod (21) for actuating the fingers,
    the actuating rod (21) is positioned in a sleeve (22) connected to the jack rod, the end of the piston (18) facing the wheel (20) with bevelled teeth,
    the control piston (18) includes teeth (25) so as to rotate the wheel (20) with bevelled teeth in the sleeve (22) upon applying pressure pulses in the jack means and therefore movements of the control piston,
    the teeth of the wheel (20) are also adapted so as to cooperate with successive notches of different heights (26, 27) of the sleeve (22), in order to define stable active and retracted positions, of the actuating rod (21).

8. The anchoring harpoon according to claim 7, further comprising a spring (24) for urging the actuating rod (21) in the retracted position.

9. The anchoring harpoon according to claim 1, wherein a corresponding end of the jack means is associated with the aircraft and a helicoidal return and flattening spring (12) is interposed between the corresponding end of the jack and the harpoon head (7).

10. The anchoring harpoon according to claim 9, wherein the helicoidal spring (12) is arranged around the jack means.

11. The anchoring harpoon according to claim 1, further comprising triggering means (15) for preventing movement of the fingers (8, 13, 14) towards the active position as long as the harpoon head is not in an abutment position in the anchoring grate (2).

12. An aircraft anchoring system for an aircraft of the drone type with a rotary wing, comprising the anchoring harpoon according to claim 1.

13. The anchoring harpoon according to claim 1, wherein, prior to use, the consumable gas cartridge (30) stores a gas.

14. The anchoring harpoon according to claim 1, wherein, prior to use, the consumable gas cartridge (30) stores $CO_2$.

15. An aircraft anchoring harpoon for cooperating with an anchoring grate (2) of a platform, comprising:
  jack means (3) with cylinder means (4), the cylinder means (4) containing a mobile piston (5) that is moveable with respect to the cylinder means (4), the mobile piston (5) comprising a jack rod (6) with a free end fixedly attached to the mobile piston (5) to move in accordance with a movement of the mobile piston (5), a free end of the rod (6) extending beyond the cylinder mean, the free end of the jack rod including a harpoon head (7) that anchors in the grate (2), the jack means being configured to deploy the harpoon head, the harpoon head (7) provided with retaining fingers (8, 13, 14);
  first control means (9) for deploying the retaining fingers from a retracted position to an active position;
  second control means (31) for deploying the harpoon head via the jack means; and
  a consumable gas cartridge before use storing a gas,
  the jack means connected to the consumable gas cartridge (30) through the second control means (31).

16. The anchoring harpoon according to claim 15, further comprising:
  a control piston (18) which is slidably movable in the jack rod (6) and associated with a rotary mechanical lock (19)) of the fingers, which is movable between a retracted position and an active position of extension of the fingers by successive applications of pressure pulses in the jack means.

17. The anchoring harpoon according to claim 16, wherein,
  the rotary mechanical lock (19) includes a wheel (20) with bevelled teeth interposed between the control piston (18) and an actuating rod (21) for actuating the fingers,
  the actuating rod (21) is positioned in a sleeve (22) connected to the jack rod (6),
  the jack end of the piston (18) faces the wheel (20) with bevelled teeth,
  the control piston (18) includes teeth (25) so as to rotate the wheel (20) with the bevelled teeth in the sleeve (22) upon applying pressure pulses in the jack means and therefore movements of the control piston, and
  the beveled teeth of the wheel (20) are also adapted so as to cooperate with successive notches of different heights (26, 27) of the sleeve (22), in order to define stable active and retracted positions, of the actuating rod (21).

18. The anchoring harpoon according to claim 17, further comprising a spring (24) urging the actuating rod (21) in the retracted position.

19. The anchoring harpoon according to claim 15, wherein, prior to use, the consumable gas cartridge (30) stores $CO_2$.

\* \* \* \* \*